US007806601B2

(12) United States Patent
Dean, Jr. et al.

(10) Patent No.: US 7,806,601 B2
(45) Date of Patent: Oct. 5, 2010

(54) MULTIFIBER FERRULE WITH PRECISION BUMPERS AND METHODS FOR MAKING THE SAME

(75) Inventors: David Lee Dean, Jr., Hickory, NC (US); Alan John Malanowski, Hickory, NC (US); Scott Timothy Schmidt, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 11/881,650

(22) Filed: Jul. 27, 2007

(65) Prior Publication Data

US 2008/0232744 A1 Sep. 25, 2008

Related U.S. Application Data (60) Provisional application No. 60/919,221, filed on Mar. 21, 2007.

(51) Int. Cl.
G02B 6/36 (2006.01)
(52) U.S. Cl. ............................. 385/85; 451/57; 385/60
(58) Field of Classification Search ............... 385/60, 385/58, 66, 71, 78, 83–85; 451/57
See application file for complete search history.

(56) References Cited

U.S. PATENT DOCUMENTS

| 5,664,039 | A | | 9/1997 | Grinderslev et al. .......... 385/65 |
|---|---|---|---|---|
| 5,667,426 | A | * | 9/1997 | Minami et al. ................ 451/41 |
| 5,707,565 | A | | 1/1998 | Suzuki et al. ............. 264/1.25 |
| 5,780,079 | A | | 7/1998 | Lee ............................. 425/577 |
| 5,786,002 | A | | 7/1998 | Dean et al. ................... 425/183 |
| 5,815,621 | A | | 9/1998 | Sakai et al. .................... 385/80 |
| 5,835,659 | A | * | 11/1998 | Ota et al. ..................... 385/137 |
| 6,045,271 | A | | 4/2000 | Shimoji et al. ................ 385/85 |
| 6,074,577 | A | | 6/2000 | Katsura et al. ............. 264/1.25 |
| 6,123,463 | A | * | 9/2000 | Kashihara et al. ............. 385/60 |
| 6,196,732 | B1 | | 3/2001 | Tamekuni et al. ............. 385/78 |
| 6,287,017 | B1 | | 9/2001 | Katsura et al. ................ 385/59 |
| 6,342,170 | B1 | | 1/2002 | Yang ......................... 264/1.25 |
| 6,443,827 | B1 | * | 9/2002 | Ryoke et al. ................. 451/533 |
| 6,619,855 | B2 | * | 9/2003 | Dudoff et al. ................. 385/78 |
| 6,663,377 | B1 | | 12/2003 | Dean, Jr. et al. ............. 425/190 |
| 6,761,489 | B1 | * | 7/2004 | Dean et al. ..................... 385/78 |
| 6,767,199 | B2 | * | 7/2004 | Dean et al. .............. 425/192 R |
| 6,957,920 | B2 | * | 10/2005 | Luther et al. .................. 385/85 |
| 7,086,847 | B2 | * | 8/2006 | Dean et al. ................... 425/190 |
| 7,261,469 | B1 | * | 8/2007 | Dean et al. ..................... 385/60 |
| 7,267,491 | B2 | * | 9/2007 | Luther et al. .................. 385/85 |
| 2002/0115386 | A1 | * | 8/2002 | Iijima et al. ................... 451/41 |
| 2003/0095753 | A1 | * | 5/2003 | Wada et al. .................... 385/78 |
| 2003/0161584 | A1 | * | 8/2003 | Ohtsuka et al. ............... 385/60 |
| 2003/0235374 | A1 | | 12/2003 | Luther et al. .................. 385/85 |
| 2004/0057671 | A1 | * | 3/2004 | Kang et al. .................... 385/71 |
| 2005/0036742 | A1 | * | 2/2005 | Dean et al. .................... 385/71 |

(Continued)

OTHER PUBLICATIONS

Patent Cooperation Treaty, International Search Report for International Application No. PCT/US2008/003586, Jul. 22, 2008, 1 page.

Primary Examiner—Ellen Kim (57) ABSTRACT

A multifiber (MF) ferrule produced using a ferrule molding insert that is jig ground in order to improve the tolerance on the bumper height of a molded ferrule and the surface finish on the region of interest (ROI), thus improving manufacturing yields.

18 Claims, 10 Drawing Sheets

U.S. PATENT DOCUMENTS

2005/0123246 A1* 6/2005 Morse et al. .................. 385/53
2006/0024012 A1* 2/2006 Yatsuda et al. .............. 385/129
2006/0072879 A1* 4/2006 Yang et al. .................... 385/85

* cited by examiner

SUMMARY

| | SURFACE FINISH Ra (um) | FLATNESS (um) |
|---|---|---|
| EDM | 0.488 | |
| SURFACE | 0.266 | 1.9 |
| JIG | 0.012 | 0.2 |

*FIG. 10*

MULTIFIBER FERRULE WITH PRECISION BUMPERS AND METHODS FOR MAKING THE SAME

CROSS REFERENCE TO RELATED APPLICATION(S)

This application claims the benefit of U.S. Provisional Application No. 60/919,221 filed Mar. 21, 2007 and entitled "MULTIFIBER FERRULE WITH PRECISION BUMPERS AND METHODS FOR MAKING THE SAME."

BACKGROUND OF THE INVENTION

1. Field of the Invention

The present invention relates generally to multifiber ferrules and methods for their manufacture, and more specifically, to improved methods for manufacturing multifiber ferrule assemblies having improved bumper height tolerances and region of interest surface finishes.

2. Technical Background

Multiple optical fibers, either presented in individual or ribbonized form, are commonly terminated using multifiber connectors. In order to interconnect these fibers with a minimum amount of attenuation, corresponding multifiber connectors may be mated such that opposing optical fibers are biased into contact with one another. To achieve optimal transmission without utilizing refractive index matching gel, the multifiber connectors are precisely core aligned and are in physical contact. Fine connector alignment is typically provided by a pair of guide pins that seat within bores to provide a male ferrule. The guide pins protrude from the connective end of the male ferrule and are received within corresponding guide pin bores defined by a female ferrule upon mating. In addition to ferrule alignment, the geometry of the ferrule and, in particular, the polish geometry of the end face of the ferrule, is extremely important to insure proper fiber-to-fiber contact and coplanarity between fibers. In this regard, at least the portion of the end face of each ferrule that is proximate to the optical fibers, referred to herein as the "region of interest," is preferably polished and/or processed to define a plane extending perpendicular to the longitudinal axis defined by the guide pin bores and, therefore, perpendicular to the optical fiber bores. In addition, the planar surface defined by the portion of the end face of each ferrule proximate to the fiber openings is precisely positioned relative to the ends of the optical fibers. For example, with proper polish/process geometry, the optical fibers will extend by a predetermined distance beyond the end face of the ferrule so that fiber-to-fiber contact between opposing optical fibers is established. If, however, the polish/process geometry is not precisely defined, fiber-to-fiber contact may be prevented or otherwise obstructed by contact between those portions of the end faces of the opposing ferrules that extend beyond the ends of the optical fibers.

Conventional ferrules available from Corning Cable Systems of Hickory, N.C., include not only a ferrule body defining guide pin and fiber bores, but also include polishing bumpers that function as a polishing reference surface for polishing the optical fibers to a proper height from the end face and achieving the appropriate coplanarity between fibers. With regard to ferrules having a generally rectangular end face, a polishing bumper is typically located about each side of the region of interest of the end face. While the fiber bores typically open through the region of interest, the guide pin bores typically open through the bumpers. Once the optical fibers have been polished to their proper predetermined height, the bumpers are typically ground away or removed to a depth recessed from the region of interest so that they do not physically contact bumpers of a mating connector. Thus, after fiber polishing, the bumpers are ground to a height less than the protrusion of the optical fibers themselves.

Figure 1:
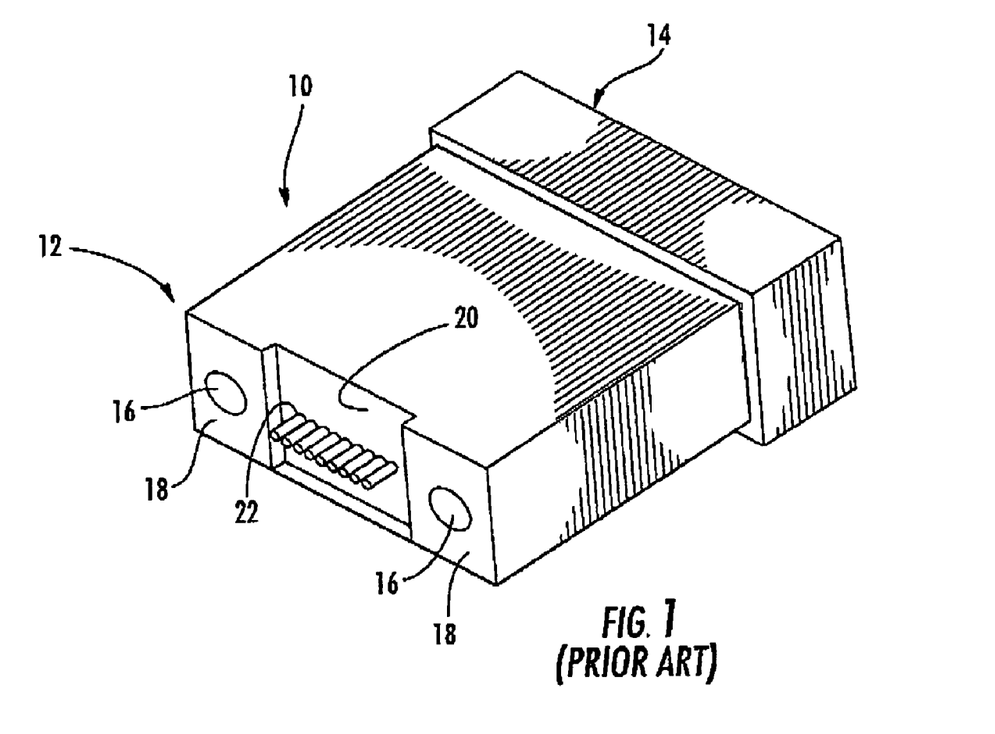
FIG. 1 is a perspective view of a conventional multifiber (MI) ferrule.
Figure 2:
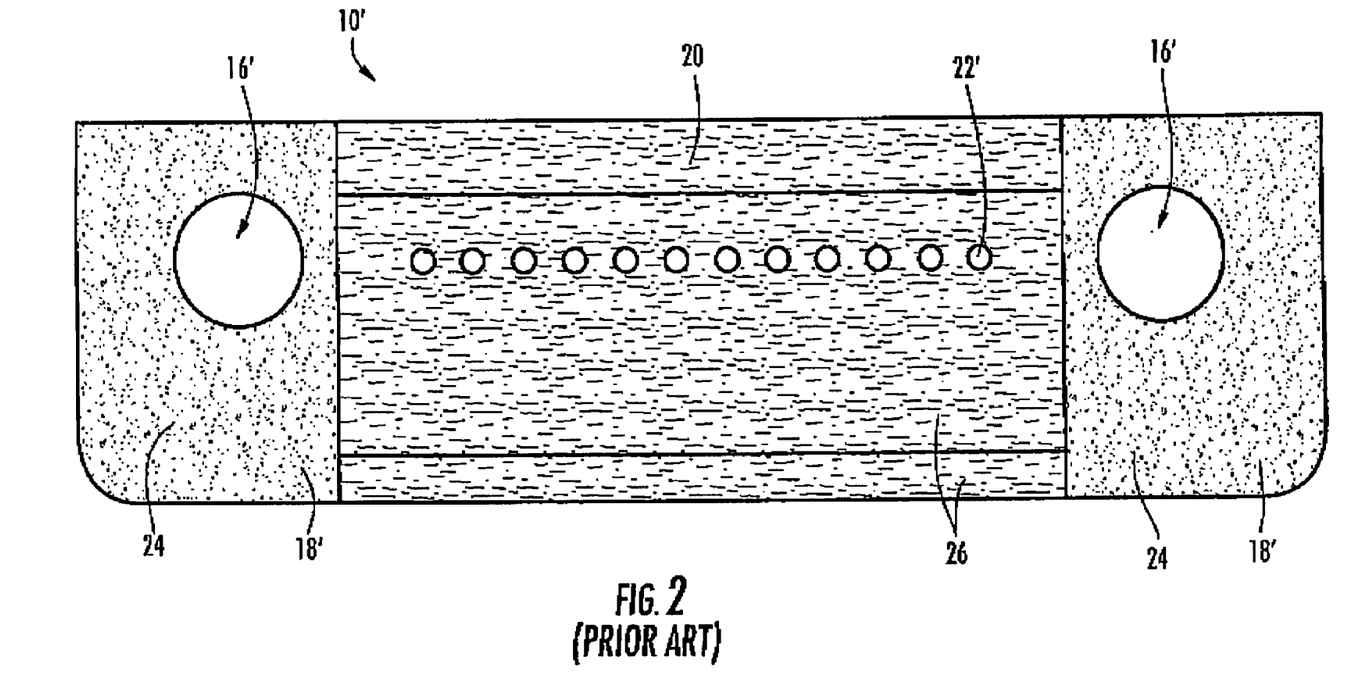
FIG. 2 is a front view of the multifiber ferrule insert constructed in accordance with conventional methods and processed by having its bumpers EDM and its region of interest surface ground.

Referring to prior art FIGS. 1 and 2, a conventional multifiber ferrule 10 and a conventional multifiber ferrule molding insert 10' are shown. The multifiber ferrule 10 includes a generally rectangular end face forming portion 12 and bumper forming portions (not numbered). Guide pin bore forming pins are held within guide pin openings 16. Fiber bore forming pins are held within fiber pin openings 18. Turning to FIG. 2, multifiber ferrule insert 10' used for molding conventional multifiber ferrule 10 includes bumper forming portions that are formed and/or processed by an electrical discharge machining (EDM) process (indicated by the shaded region marked as 24), and the region of interest 20 is conventionally formed and/or processed by a surface grind process (indicated by the shaded region marked as 26). These processing techniques are apparent to manufacturers when viewing processing marks left on the connective end of the molding insert under magnification.

Figure 3:
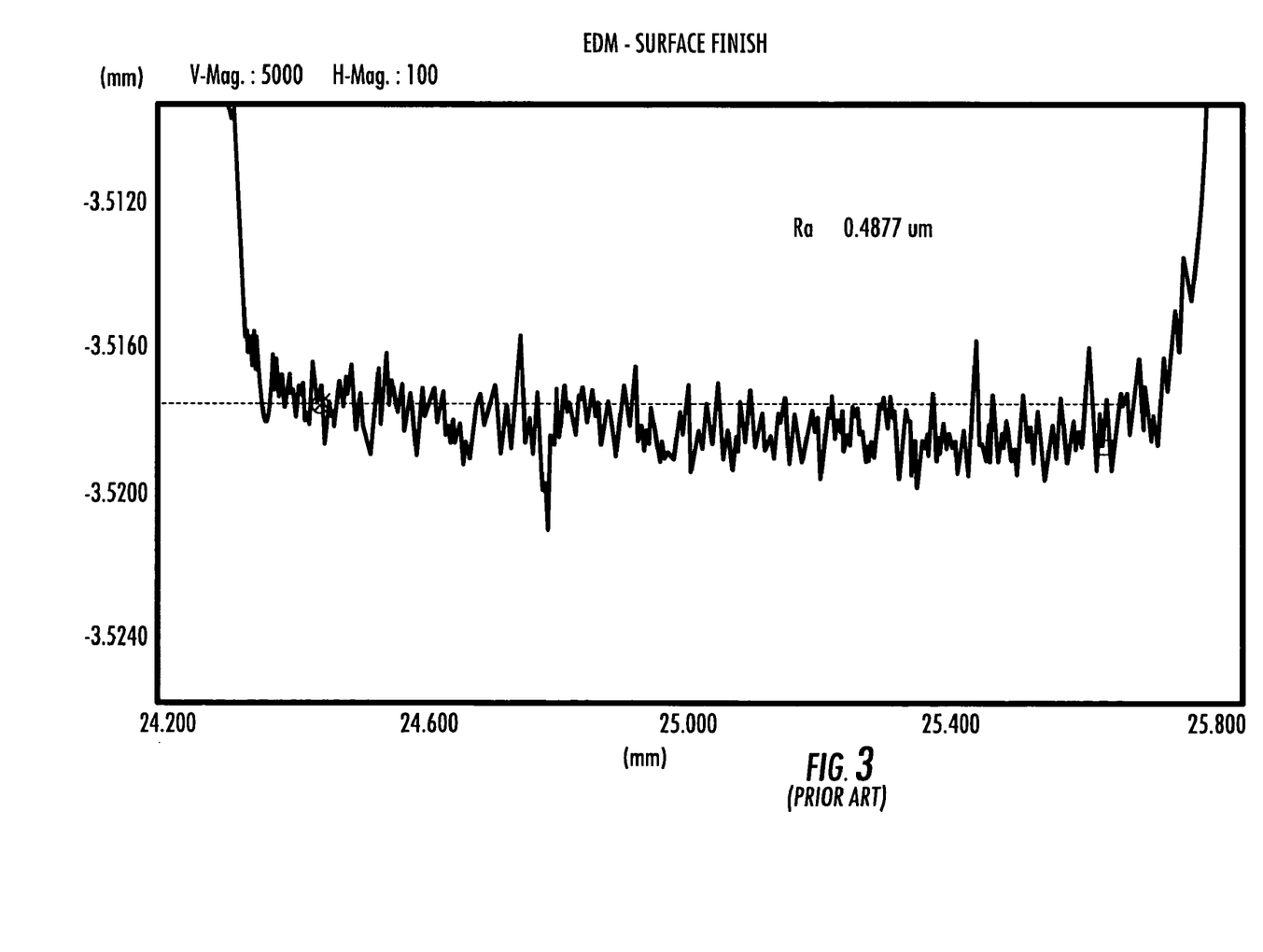
FIG. 3 is a graphical plot representation of the resulting roughness of the end face surface finish resulting from a sample ferrule insert of FIG. 2 having its polishing bumpers processed by EDM.
Figure 4:
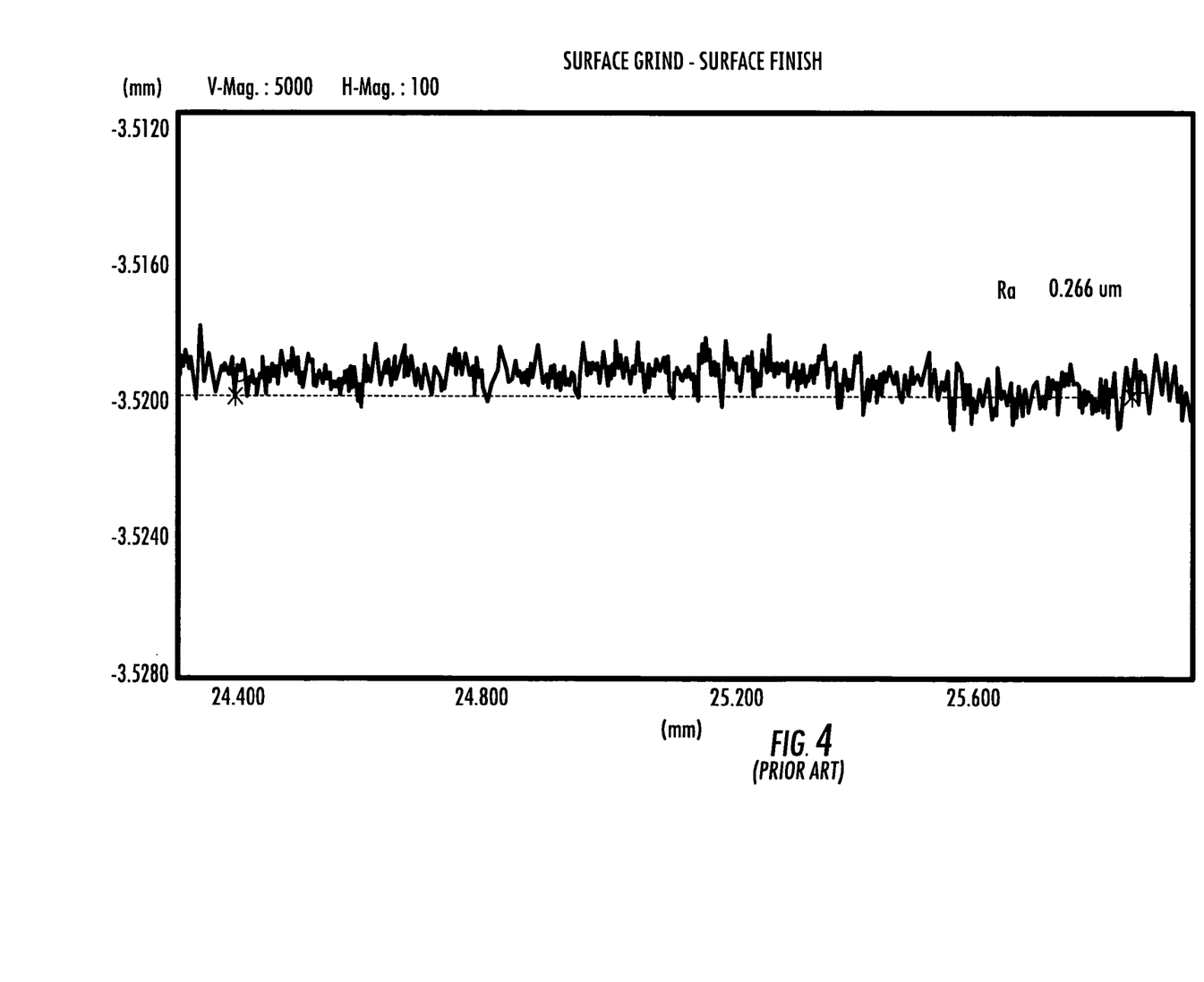
FIG. 4 is a graphical plot representation of the end face surface finish resulting from a sample ferrule insert of FIG. 2 having its region of interest processed by surface grinding.
Figure 5:
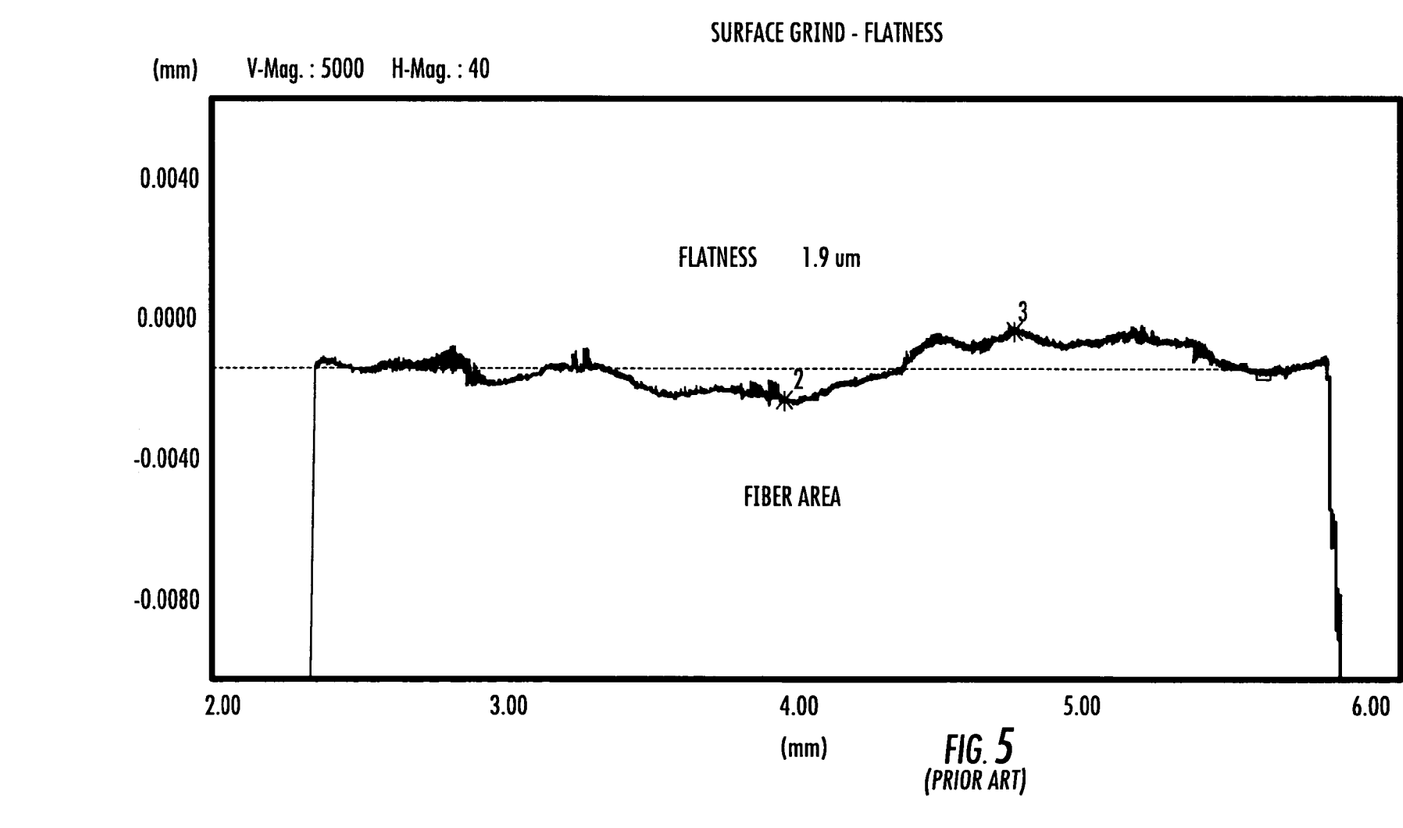
FIG. 5 is a graphical plot representation of the end face flatness resulting from a sample ferrule insert of FIG. 2 having its region of interest processed by surface grinding.

Referring to FIGS. 3-5, a conventional ferrule molding insert whose end face was EDM and surface ground processed was analyzed for surface finish and flatness. Referring specifically to FIG. 3, a graphical plot representation of the resulting roughness of the end face surface of an EDM processed insert yielded an average roughness ($R_a$) of 0.4877 µm. Referring specifically to FIGS. 4-5, graphical plot representations of the end face surface finish and flatness resulting from the sample ferrule insert having its region of interest processed by surface grinding is shown, respectively. As shown, the surface finish of the region of interest yields an $R_a$ of 0.266 µm (FIG. 4) and a flatness across the fiber area of 1.9 µm (FIG. 5).

Current tolerances for polishing bumper heights are about 15+/−5 microns. However, to improve manufacturing yields, it would be desirable to control the tolerance on the bumper height more precisely. Specifically, it would be desirable to establish acceptable tolerances on the order of 15+/−3 microns. Still further, it would be desirable to establish tolerances of 15+/−2 microns. Further, with respect to the region of interest, current tolerances are 94 nm $R_a$. Accordingly, it would be desirable to develop an improved ferrule insert surface processing method to improve the surface finish of the region of interest of a molded ferrule. A ferrule molding insert having an improved surface finish and flatness will translate into a ferrule having an improved surface finish and flatness. Thus, what is desired are improved multifiber ferrule molding insert processing methods.

SUMMARY OF THE INVENTION

In various embodiments, the present invention provides a multifiber ferrule molding insert and methods for processing a ferrule molding insert including jig grinding to improve the tolerance on the polishing bumper height of a molded ferrule, thus improving manufacturing yields. The invention further provides a method for improving surface finish on the region of interest forming portion of the ferrule molding insert, thus improving ferrule manufacturing yields. Ferrule insert processing methods include using a jig grinder to complete the bumper forming surfaces of the insert along with the region of interest forming surface. A particular embodiment includes grinding using the bottom surface of a jig grinding wheel as opposed to conventional methods in which the sides of the jig grinding wheel are used.

Tolerances achieved using a jig ground ferrule molding insert of the present invention for the bumper portions of the insert are about 15+/−3 microns, more preferable 15+/−2 microns. Region of interest surface was improved from about 94 nm $R_a$ using a surface grind technique to about 18 nm $R_a$ using the jig grinding technique of the present invention. Bumper surface finish was improved from about 300 nm $R_a$ to about 18 nm $R_a$. The tolerances achieved using the processing methods of the present invention provide a significant improvement over conventional insert manufacturing methods, thereby resulting in ferrules with improved surface finish and flatness.

In exemplary embodiments described herein, the multifiber ferrule insert defines a generally rectangular end face forming portion that is processed subsequent to the molding process. The end face defines a plurality of fiber openings extending through the ferrule body for receiving end portions of respective optical fibers; the area about the fiber openings of the end face being a region of interest. The ferrule body also defines at least one guide pin opening through the end face adapted to receive an alignment member for aligning the end portions of the respective optical fibers with corresponding end portions of the opposing optical fibers of a mating multifiber ferrule. The guide pin opening defines a longitudinal axis extending at least partially through the ferrule body and parallel to the fiber bores and the longitudinal axis of the ferrule body. The plurality of fiber openings generally open through a medial portion of the end face of the ferrule body, while the guide pin openings generally open through a lateral portion of the end face of the ferrule body. At least one and preferably a pair of polishing bumpers extend outwardly in a forward direction relative to the end face. The bumpers are eventually, prior to ferrule mating, ground down to a predetermined depth, for example, the bumpers may be entirely removed down to the end face.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present exemplary embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the detailed description, serve to explain the principles and operations thereof.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE PREFERRED EMBODIMENTS

The present invention will now be described more fully hereinafter with reference to the accompanying drawings in which exemplary embodiments of the invention are shown. However, this invention may be embodied in many different forms and should not be construed as limited to the embodiments set forth herein. These exemplary embodiments are provided so that this disclosure will be both thorough and complete, and will fully convey the scope of the invention to those skilled in the art. Like reference numbers refer to like elements throughout the various drawings.

In the embodiments described herein, the present invention provides a multifiber (MF) ferrule produced using a ferrule molding insert that is jig ground in order to improve the tolerance on the bumper height of a molded ferrule, thus improving manufacturing yields. The invention further provides an improved surface finish on the region of interest (ROI) of the ferrule insert produced by a jig ground region of interest surface forming portion of the molding insert, thus also improving manufacturing yields. The term "region of interest" is used herein to describe at least a portion of the end face in the vicinity of the plurality of optical fiber openings. In all exemplary embodiments, ferrule processing methods include using a jig grinder to complete the bumper forming surfaces of the insert along with the region of interest forming surface. A particular embodiment includes grinding using the bottom surface of a specialized grinding wheel as opposed to conventional methods in which the side of the grinding wheel is used during jig grinding. As used herein, "MF ferrule" refers variously to 2f, 4f, 8f, 12f, 24f, 32f, 48f, 72f, etc. ferrules. Application to single fiber (1f) ferrules is also contemplated herein.

In the embodiments described herein, the ferrule processing methods are able to achieve new tolerances required for improved processing of a ferrule, for example, OptiTip and Con2r ferrules available from Corning Cable Systems of Hickory N.C. Tolerances achieved using a jig ground ferrule insert of the present invention for the bumper portions of the ferrule are about 15+/−3 microns, more preferable 15+/−2 microns. The region of interest surface was improved from 94 nm $R_a$ using a surface grind technique to 18 nm $R_a$ using a jig grinding technique. The bumper surface finish was improved from 300 nm $R_a$ to 18 nm $R_a$. Thus, the process allows for a more accurate and defined bumper height, left to right and top to bottom. This more accurate bumper height helps in manufacturing to remove the bumper in a more repeatable manner without "slivers." The flatter surface of the bumpers at the end face of the ferrule results in a more accurate reference surface for determining the co-planarity of the optical fibers.

In various embodiments described below, a multifiber ferrule insert is provided comprising a molded ferrule body having an end face that is processed subsequent to the molding process. As used herein throughout the specification, processing includes a manufacturing or assembly process intended to remove more than an insubstantial amount of material from the end face, or to shape the end face to a predetermined configuration, such as by jig grinding. As used herein, processing is not intended to include optical fiber polishing and cleaning. The end face defines a plurality of fiber openings extending through the ferrule body for receiving end portions of respective optical fibers. The ferrule body defines at least one guide pin opening through the end face adapted to receive an alignment member for aligning the end portions of the respective optical fibers with corresponding end portions of the opposing optical fibers of a mating multifiber ferrule. The guide pin opening defines a longitudinal axis extending at least partially through the ferrule body and parallel to the fiber openings and the longitudinal axis of the ferrule body.

Figure 6:
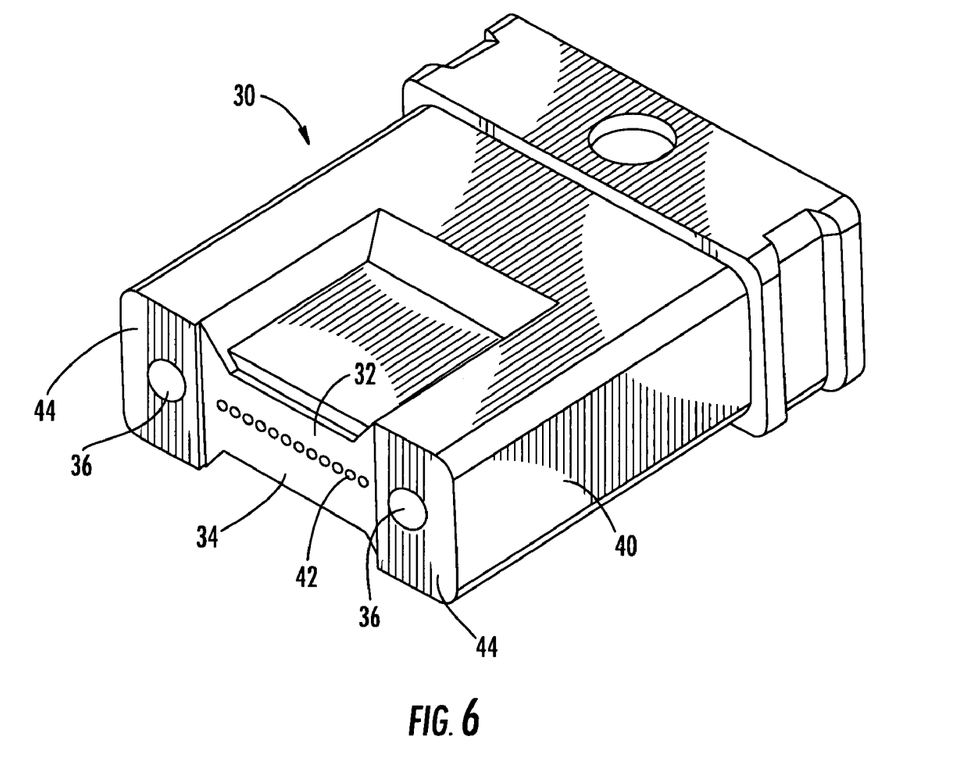
FIG. 6 is a perspective view of a multifiber ferrule constructed and processed in accordance with an exemplary embodiment of the present invention.

As known to those skilled in the art, the ferrule may be assembled according to any conventional technique for assembling multifiber ferrules. In one assembly example, the ferrule may be molded defining a pair of guide pin openings and a predetermined number of fiber openings extending through the ferrule body for receiving a plurality of optical fibers. An adhesive may be inserted into the fiber openings, followed by the optical fibers. For a male ferrule, an adhesive and guide pins are also inserted into the guide pin openings. The ferrule assembly is then allowed to dry or cure in a conventional oven, autoclave, or the like, in a known manner. Referring to FIG. 6, an exemplary embodiment of a molded fiber optic ferrule constructed and processed in accordance with the present invention is shown. As shown, the molded fiber optic ferrule 30 mounted upon the end portions of the optical fibers generally includes a ferrule body 40 having a generally rectangular-shaped end face 34 about the connective end of the ferrule. While the end face 34 of the ferrule 30 of the present invention comprises a region of interest (ROI) 32 on the end face 34 in the vicinity of fiber openings 42, the remainder of the ferrule 30 may have any desired shape and, as such, may have the shape of any conventional ferrule including, but not limited to, a multifiber ferrule, such as an MTP, MT-RJ, MPO or SC/DC ferrule, or a single fiber ferrule, such as an SC, ST, or LC ferrule.

The ferrule body 40 defines at least one fiber opening 42 extending along a longitudinal axis of the ferrule body 40 and adapted to receive an optical fiber (not shown) therein. While the ferrule may be a single fiber ferrule that defines only a single fiber opening 42, ferrules shown throughout and described herein are multifiber ferrules and define a plurality of fiber openings 42 adapted to receive a plurality of optical fibers therein. In addition, while the multifiber ferrules are shown having only a single row of fiber openings 42, the molded ferrule may comprise any number of fiber openings 42 arranged in any predetermined manner including, but not limited to, multiple rows of fiber openings 42 (e.g., a multiple row, multifiber array). Typically, multifiber ferrules also define at least one and, more commonly, a pair of guide pin openings 36 adapted to receive respective alignment members, such as guide pins (not shown).

The plurality of fiber openings 42 generally open through a medial portion of the end face 34 of the ferrule body 40, while the guide pin openings 36 generally open through a lateral portion of the end face 34 of the ferrule body 40. At least one and preferably a pair of polishing bumpers 44 extend outwardly in a forward direction relative to the end face 34. The plurality of optical fibers may extend a predetermined amount beyond the surface of the end face 34. In all embodiments, the amount of protrusion of the optical fibers from the end face 34 may be in the range from about 0 to about 15 microns, more preferably from about 3 to about 15 microns.

To ensure proper contact between optical fibers, and thus good optical transmission at the ferrule end face 34, the end face 34 should be polished generally perpendicular to the fiber openings 42. The guide pin openings 36 are generally parallel to the fiber openings 42, since the guide pin openings 36 and the guide pins are used to align mating ferrules, and particularly the opposing optical fibers of mating ferrules. The bumpers 44 may provide a polishing plane for one step in obtaining co-planarity of the optical fibers. As such, the height of the bumpers 44 after polishing may be used as a reference to determine the height of the optical fibers. The bumpers 44 are eventually ground down to a predetermined depth, for example, the bumpers 44 may be entirely removed down to the end face 34. As stated above, the end face surface 32 is not machined subsequent to the molding process.

Figure 7:
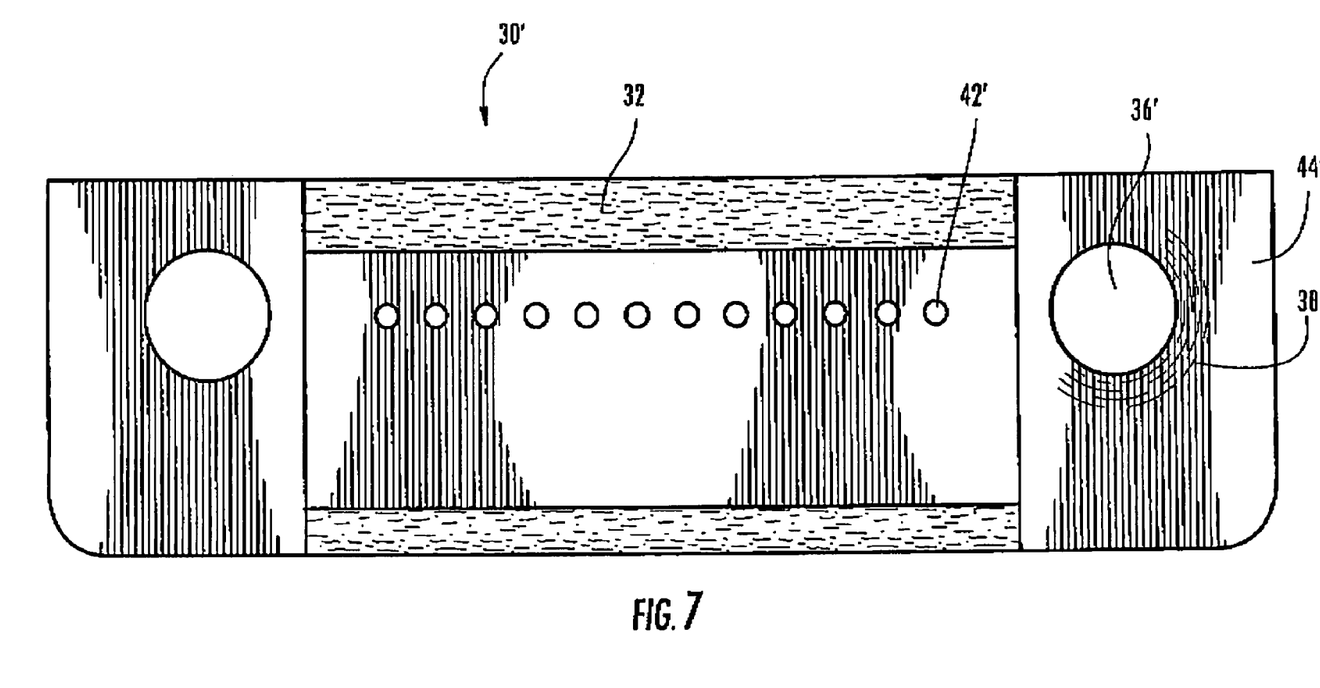
FIG. 7 is a front view of a ferrule insert used for making the multifiber ferrule of FIG. 6, which is constructed and processed in accordance with the present invention.

Referring now to FIG. 7, the end face surface 32 of the ferrule molding insert 30' processed by jig grinding is shown. As stated above, jig grinding may include grinding using the bottom portion of a jig grinding wheel as is known in the art. In alternative embodiments, jig grinding may include grinding on the side of the wheel or using another precision rotating grinding surface. Desired flatness of the present invention may also be produced using diamond tuning. Any surface of the ferrule molded insert using processes described herein may be used as a metrology datum for determining fiber height and fiber co-planarity. As shown, both the bumpers 44' and the region of interest 32 are jig ground and grinding marks 38 are visible under magnification.

Figure 8:
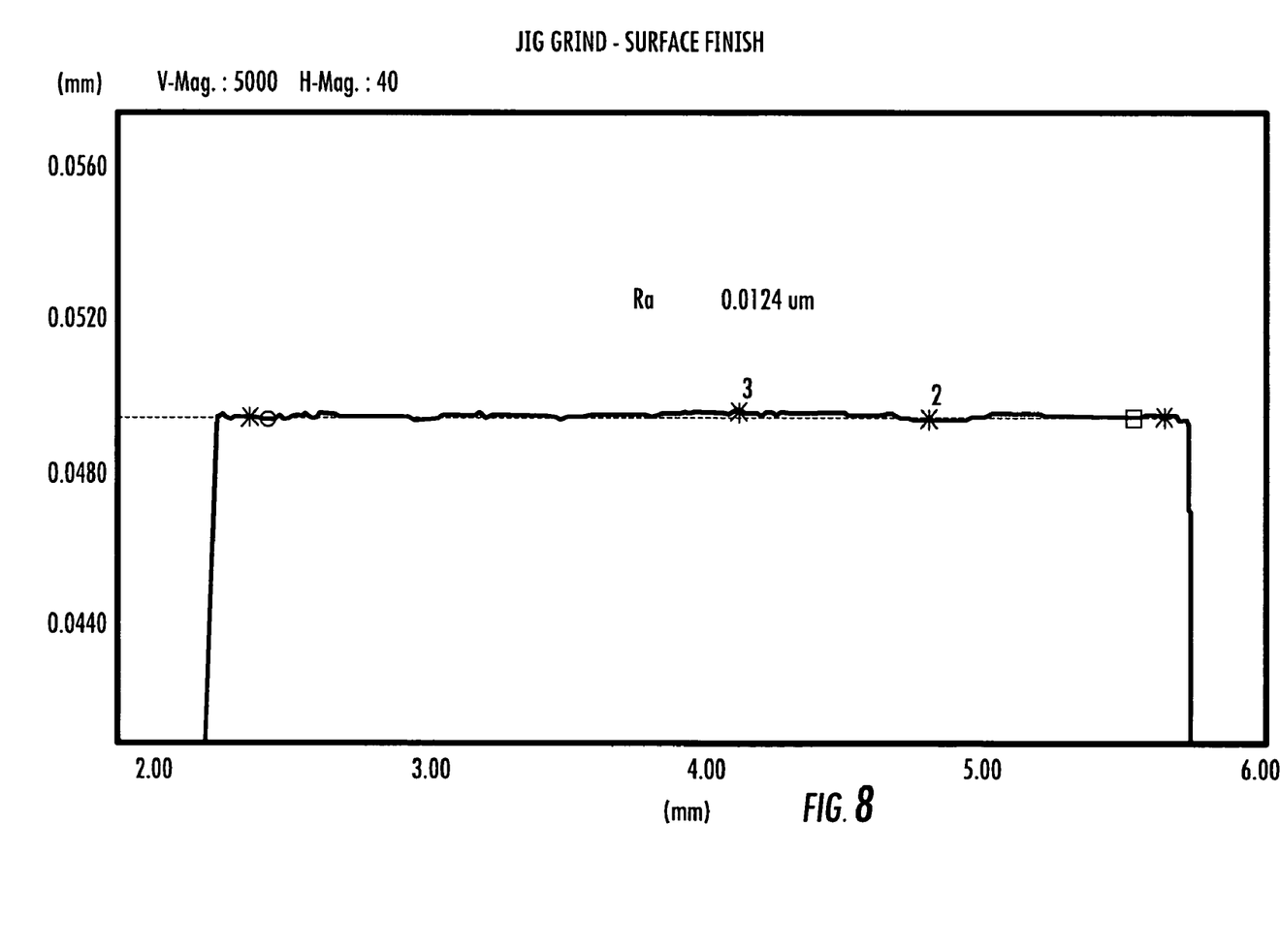
FIG. 8 is a graphical plot representation of the end face surface finish resulting from a sample ferrule insert of FIG. 7 having its polishing bumpers processed by jig grinding.
Figure 10:
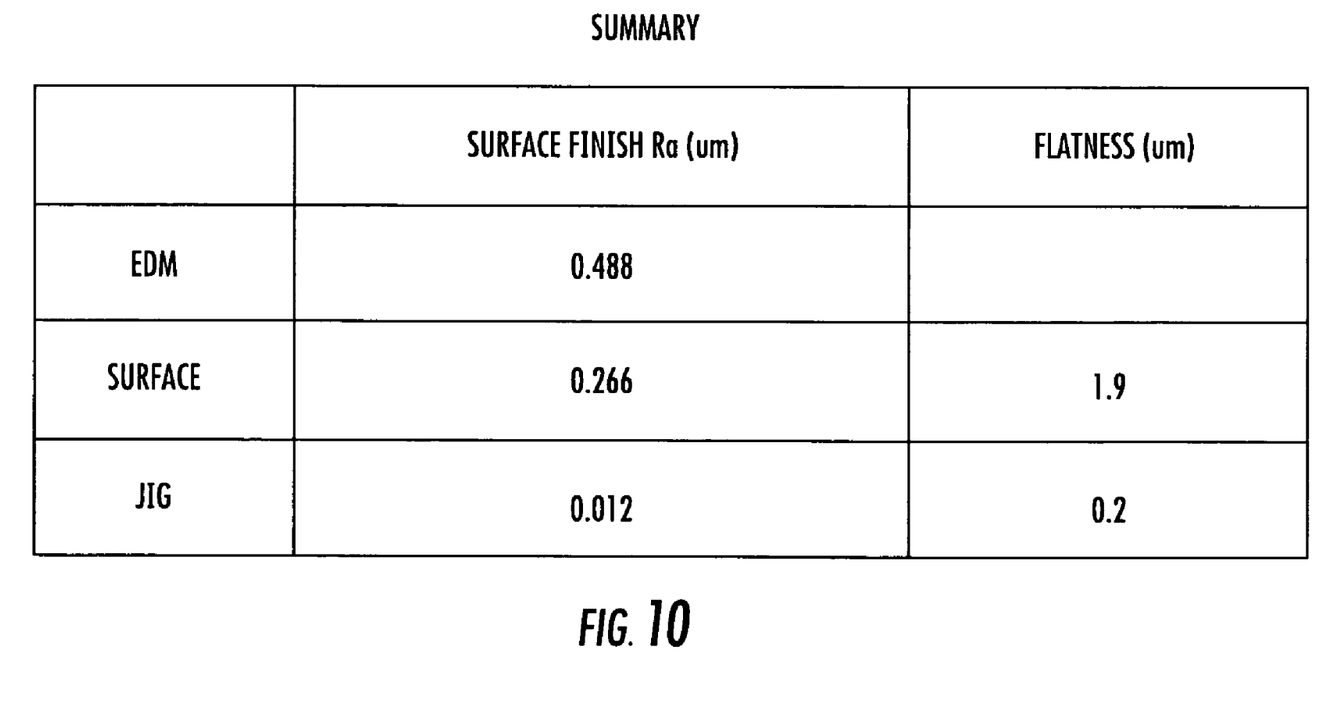
FIG. 10 is a chart summarizing the surface finish and flatness of ferrule inserts produced using an EDM process, surface grinding process and jig grinding process.

An exemplary ferrule insert was provided and had its front end processed by jig grinding. The resultant product set forth the improved results (FIG. 10). Referring now specifically to FIG. 8, a graphical plot representation of the end face surface finish resulting from a sample ferrule insert having its polishing bumpers processed by jig grinding is illustrated. As illustrated, the surface finish of the polishing bumpers yields an average roughness ($R_a$) of 0.0124 μm. This result is a significant improvement over the existing art. Further, this method of processing allows manufacturers to more precisely control the bumper height tolerances.

Figure 9:
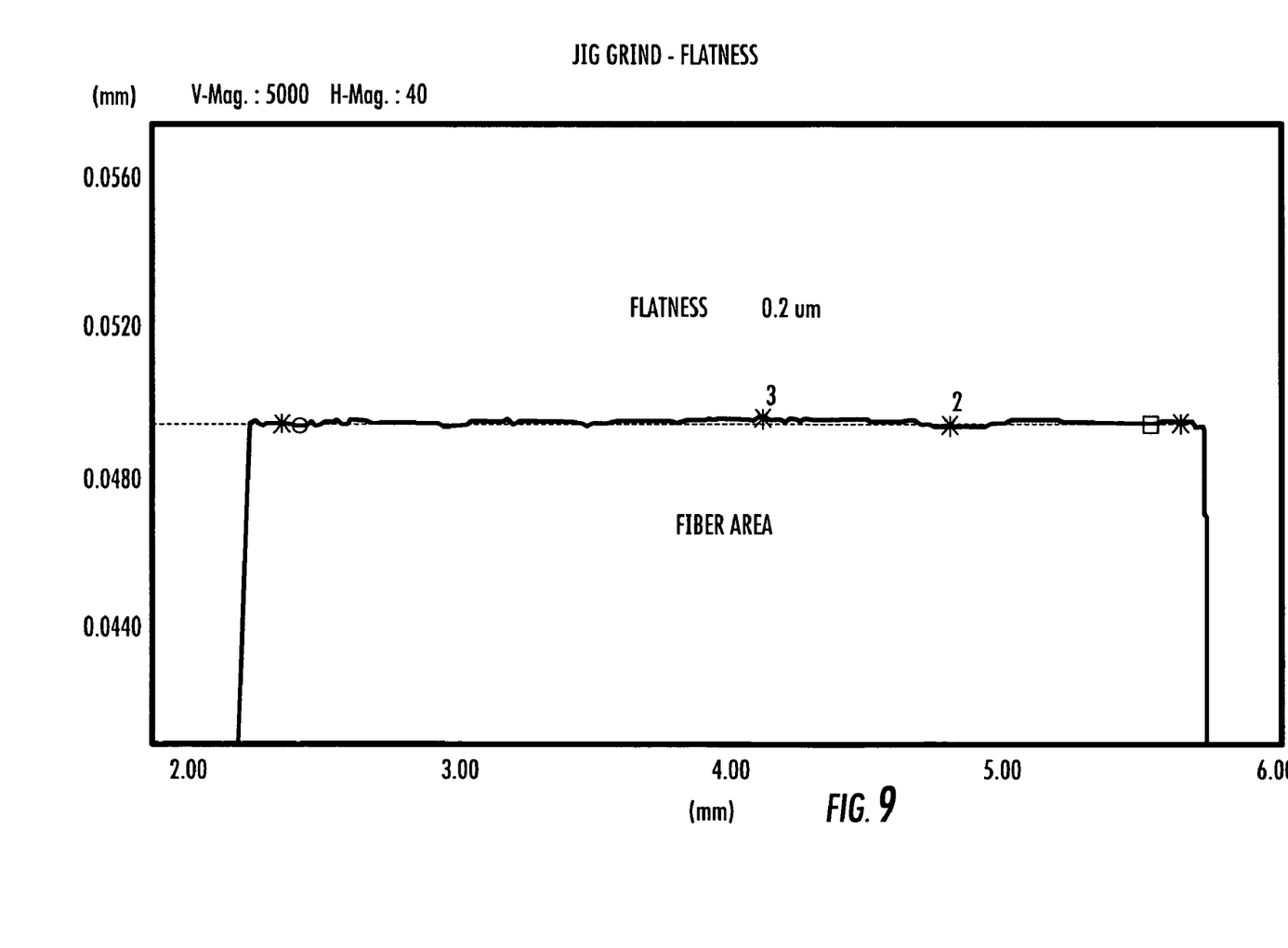
FIG. 9 is a graphical plot representation of the end face flatness resulting from a sample ferrule insert of FIG. 7 having its region of interest processed by jig grinding.

Referring now to FIG. 9, a graphical plot representation of the end face flatness resulting from a sample ferrule insert having its region of interest processed by jig grinding is shown. As shown, the region of interest yields a flatness across the fiber area of 0.2 μm. Again, this result is a significant improvement over the existing art.

Referring now to FIG. 10, a chart summarizing the surface finish and flatness of inserts produced using an EDM process, surface grinding process and jig grinding process is shown. As can be seen by the chart, the jig ground insert produces a ferrule having the most desired surface finish and flatness.

Further, the jig grinding process overcomes the shortcomings of the prior art and produces a ferrule within the desired tolerances.

The embodiments described above provide advantages over conventional MF ferrules and associated methods of manufacture. For example, the exemplary embodiments described herein allows for improved manufacturing yields relative to bumper height tolerances and surface finish and flatness of regions of interest along the end face of a multifiber ferrule.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A ferrule molding insert, comprising:
   a region of interest forming portion having a surface that is jig ground; and
   at least one bumper forming portion having a surface that is jig ground.

2. The molding insert according to claim 1, wherein the molding insert produces a
   ferrule having a bumper height tolerance of 15+/−3 microns.

3. The molding insert according to claim 1, wherein the molding insert produces a
   ferrule having a bumper height tolerance of 15+/−2 microns.

4. The molding insert according to claim 1, wherein a region of interest surface and a bumper surface of a ferrule molded using the insert have a surface finish less than about 25 nm $R_a$.

5. The molding insert according to claim 1, wherein a region of interest surface and a bumper surface of a ferrule molded using the insert have a surface finish less than 20 nm $R_a$.

6. The molding insert according to claim 1, wherein the insert is jig ground using a bottom portion of a grinding wheel.

7. A ferrule molded using a molding insert comprising:
   a ferrule body defining at least one fiber opening for receiving an optical fiber therein;
   an end face positioned about the at least one fiber opening of a connective end of the ferrule body providing an end face plane;
   a region of interest located on the end face and about the at least one fiber opening;
   at least one guide pin opening for receiving a guide pin therein;
   at least one bumper located about the at least one guide pin opening and wherein the end face is not positioned on the bumper; and
   wherein the ferrule has a region of interest surface and a bumper surface finish less than about 25 nm $R_a$.

8. The ferrule according to claim 7, wherein the ferrule has a bumper height tolerance of 15+/−3 microns.

9. The ferrule according to claim 7, wherein the ferrule has a bumper height tolerance of 15+/−2 microns.

10. A method of manufacturing a multi-fiber ferrule molding insert, comprising:
    jig grinding a region of interest forming portion on the molding insert, and
    jig grinding at least one bumper forming portion on the molding insert.

11. The method according to claim 10, wherein the molding insert produced has a
    ferrule having a bumper height tolerance of 15+/−3 microns.

12. The method according to claim 10, wherein the molding insert produced has a ferrule having a bumper height tolerance of 15+/−2 microns.

13. The method according to claim 10, wherein a region of interest surface and a bumper surface have a surface finish less than about 25 nm $R_a$.

14. The method according to claim 10, wherein a region of interest surface and a bumper surface have a surface finish less than 20 nm $R_a$.

15. The method according to claim 10, wherein the jig grounding of the region of interest forming portion is performed by using a bottom portion of a grinding wheel.

16. The method according to claim 10, wherein the jig grounding of the at least one bumper forming portion is performed by using a bottom portion of a grinding wheel.

17. The method according to claim 10, wherein the region of interest forming portion has a flatness of about 0.2 μm.

18. The method according to claim 10, wherein the at least one bumper forming portion has a roughness of about 0.0124 μm $R_a$.

* * * * *